Dec. 1, 1959  W. M. BOGERT ET AL  2,915,694
TAP-CHANGING EQUIPMENT

Filed June 24, 1957  4 Sheets-Sheet 2

WITNESSES

INVENTORS
William M. Bogert &
Henry V. Johnson.
BY
ATTORNEY

United States Patent Office 2,915,694
Patented Dec. 1, 1959

2,915,694

TAP-CHANGING EQUIPMENT

William M. Bogert and Henry V. Johnson, Hickory Township, Mercer County, Pa., assignors to Westinghouse Electric Corporation, East Pittsburgh, Pa., a corporation of Pennsylvania Application June 24, 1957, Serial No. 667,601

16 Claims. (Cl. 323—43.5)

This invention relates to transformers and more particularly to tap-changing equipment used with transformers.

Many transformers are operated under conditions which require that the voltage ratio between the primary and secondary windings be adjusted at intervals. This may be accomplished by providing one of the transformer windings with a plurality of tap connections so that by operation of tap-changing equipment associated with the transformer, a selected number of turns of one of the windings may be excluded from or included in the winding circuit, as desired, thus varying the effective number of turns in the winding.

In certain types of liquid-filled power transformers, such as furnace transformers, one of the windings is provided with a very large number of tap connections. In a conventional transformer of this type, only a limited number of tap connections are made available to the tap-changing equipment for a particular application of the transformer. In the usual arrangement, all of the tap connections are brought to a terminal board which is located underneath the insulating liquid inside the tank of the transformer. This terminal board is normally accessible through a manhole in the cover of the transformer and is provided with a number of link connections. The desired tap connections are made available to the tap-changing equipment by manually changing the link connections on the terminal board inside the tank of the transformer. When such a transformer is initially placed in service, the desired tap connections to be made available to the tap-changing equipment are selected by means of the link connections on the terminal board. If after a period of operation it is decided that different tap connections should be made available to the tap-changing equipment, it is necessary to deenergize the transformer and allow it to cool sufficiently so that a man can enter the transformer through the manhole and change the necessary links on the terminal board. An outage of appreciable duration is therefore necessary to change the tap connections available to the tap-changing equipment. In addition, there is a danger that a man entering the transformer may drop some tools or other items in the transformer windings which may later cause electrical failure of the transformer.

It is therefore desirable that tap-changing equipment be provided for a transformer having a winding with a large number of tap connections such that it will be unnecessary to enter the transformer tank to select the tap connections which will be available to the tap-changing equipment.

It is an object of this invention to provide new and improved tap-changing equipment for use with transformers.

Another object of this invention is to provide a new and improved means for limiting the number of taps which the tap-changing equipment may select from all of the taps connected to the tap-changing equipment associated with the transformer.

A more specific object of this invention is to provide tap-changing equipment for a transformer in which all the taps in the windings of the transformer are made available to said tap-changing equipment, but undesired tap positions may be eliminated from the operation of said tap-changing equipment by changes in the connections of the control circuit of said tap-changing equipment.

Other objects of the invention will, in part, be obvious and, in part, appear hereinafter.

For a fuller understanding of the nature and objects of the invention, reference should be had to the following detailed description taken in connection with the accompanying drawings, in which.

Figure 1:
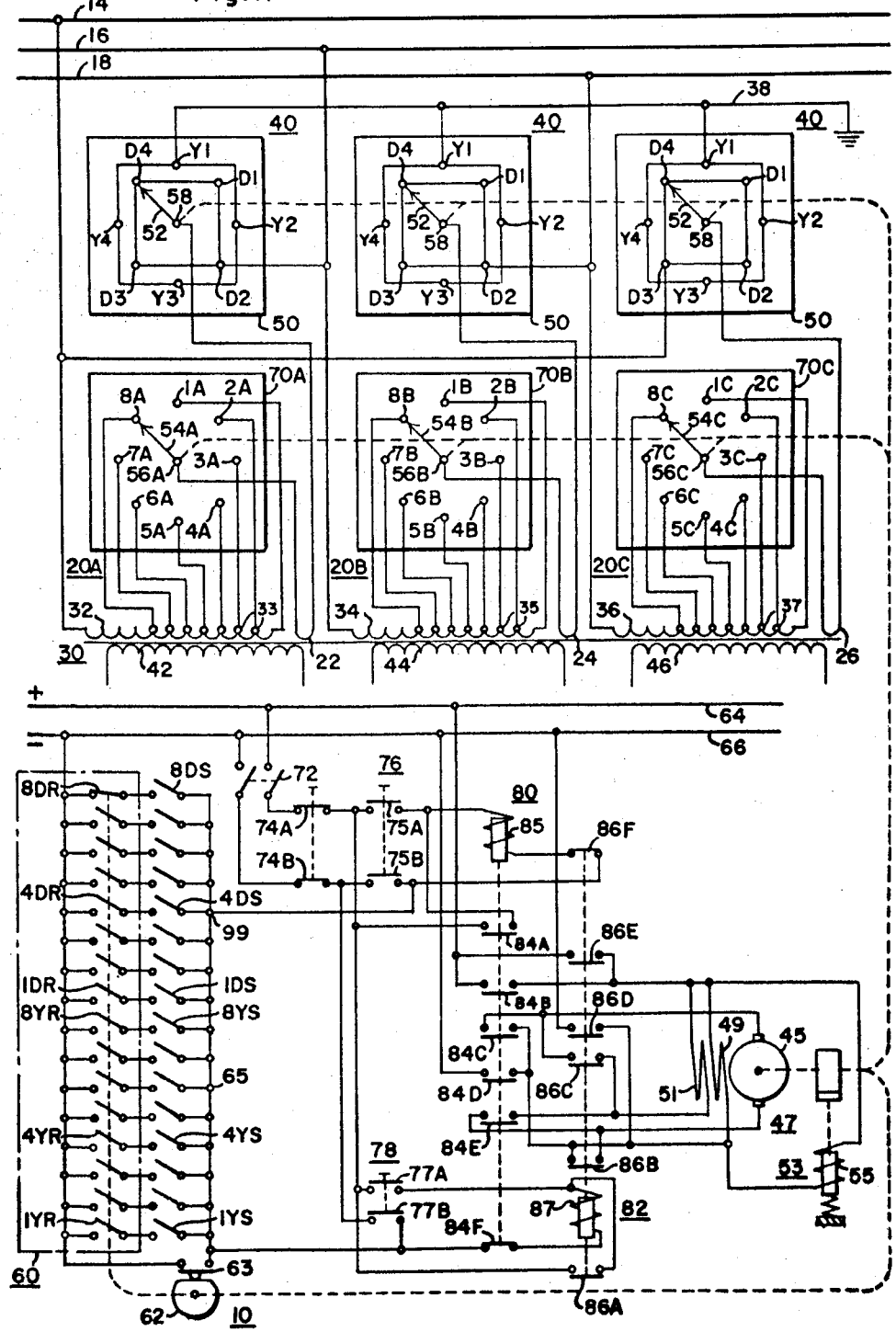
Fig. 1 is a diagrammatical view showing the connections between the tap-changing equipment and the windings of the transformer.

Referring now to the drawings and Fig. 1 in particular, there is shown a transformer 30 having primary winding sections 32 and 22, 34 and 24, and 36 and 26, and secondary windings 42, 44 and 46. In this instance, the transformer 30 is disposed to receive power from the line conductors 14, 16 and 18 which are part of a three-phase electrical power system. The tap-changing equipment, which is provided to determine the manner in which the primary windings of the transformer 30 are connected to the line conductors 14, 16 and 18, includes the delta-Y switches 40, the tap-changer position selector switches 20A, 20B and 20C, and the tap-changer control circuit 10.

The primary winding sections 32, 34 and 36 are each provided with a plurality of tap connections 33, 35 and 37 respectively. The primary winding sections 22, 24 and 26 each include a fixed number of turns which are connected in series circuit relationship with a portion of the primary winding sections 32, 34 and 36, respectively. The primary winding sections 32 and 22 are connected to one of the phases of the three-phase electrical system at the line conductors 14, 16 and 18. The primary winding sections 32, 34 and 36 are permanently connected to the line conductors 14, 16 and 18, respectively.

The delta-Y switches 40 are provided to control whether the primary windings of the transformer 30 are to be connected either in a delta or a Y arrangement. Each of the delta-Y switches 40 is provided with a terminal board 50, a common terminal 58, a movable selector arm 52, and eight positions Y1 to Y4 and D1 to D4. Each of the common terminals 58 of the delta-Y switches 40 is connected to the right end of one of the primary winding sections 22, 24 and 26. The positions Y1 to Y4 of the delta-Y switches 40 are connected to each other and also in common to the neutral connection 38. The positions D1 to D4 of each of the delta-Y switches 40 are also connected to each other, with each group of D1 to D4 positions being connected to one of the line conductors 14, 16 and 18. Since one end of each pair of primary windings 32 and 22, 34 and 24, and 36 and 26 is connected to the neutral connection 38 when the delta-Y switches 40 are in the positions Y1 to Y4, the primary windings of the transformer 30 will be connected in a Y arrangement for the positions Y1 to Y4. On the other hand, when the delta-Y switches 40 are in the positions D1 to D4, it will be seen by inspection that the primary windings of the transformer 30 are connected in a delta arrangement. In summary, the delta-Y switches 40 are connected so that as the selector arm 52 rotates, the primary windings of the transformer 30 will be alternately connected either in a delta or Y arrangement.

The tap-changer position selector switch 20A is connected to the primary winding switches 32 and 22 to select the number of turns of the winding section 32 that will be connected in series circuit relationship with the winding section 22. In like manner, the tap-changer position selector switches 20B and 20C are connected to the primary winding sections 34 and 24, and 36 and 26, respectively. In particular, the tap-changer position selector switch 20A comprises a terminal board 70A, a common terminal 56A, a movable selector arm 54A, and a plurality of tap positions 1A to 8A. Similarly, the tap-changer position selector switches 20B and 20C comprise the terminal boards 70B and 70C, respectively, common terminals at 56B and 56C, and a plurality of tap positions 1B to 8B and 1C to 8C, respectively. The plurality of tap connections 33 is connected to the tap positions 1A to 8A of the tap-changer position selector switch 20A. The common terminal 56A of the selector switch 20A is connected to the left end of the primary winding section 22. In like manner, the plurality of tap connections 35 is connected to the tap positions 1B to 8B of the selector switch 20B and the left end of the primary winding section 24 is connected to the common terminal 56B of the selector switch 20B. In like fashion, also, the plurality of tap connections 37 is connected to the tap positions 1C to 8C of the selector switch 20C and the left end of the primary winding section 26 is connected to the common terminal 56C of the selector switch 20C. In general, the tap-changer position selector switches 20A, 20B and 20C are connected so that as the selector arms 54A, 54B and 54C rotate, a tap connection will be selected which will determine what portion of the primary winding sections 32, 34 and 36 is connected in series circuit relationship with the primary winding sections 22, 24 and 26, respectively.

Referring to Fig. 1, the selector arms 52 of the delta-Y switches 40 and the selector arms 54A, 54B and 54C of the tap-changer position selector switches 20A, 20B and 20C are mechanically linked to a reversible, direct current drive motor 47 whose operation is controlled by the control circuit 10. By the use of mechanical means which will be described hereinafter, the selector arms 52 of the delta-Y switches 40 will rotate one position for each complete revolution of the corresponding selector arms 54A, 54B and 54C of the selector switches 20A, 20B and 20C when the selector arms 54A, 54B and 54C rotate between the positions 8A to 1A, between the positions 8B and 1B, and between the positions 8C and 1C, respectively.

The reversible motor 47 comprises an armature 45, a shunt field 49, and a series field 51. The motor 47 is energized from a direct current source at the conductors 64 and 66 to turn in one direction or the other whenever the "lower" relay 80 or the "raise" relay 82 is energized. The "lower" relay 80 comprises an operating coil 85, five normally open contacts 84A, 84B, 84C, 84D and 84E, and one normally closed contact 84F. The "raise" relay 82 comprises an operating coil 87, five normally open contacts 86A, 86B, 86C, 86D and 86E and one normally closed contact 86F.

In order to insure a complete step operation of the selector switches 20A, 20B and 20C, a cam switch 62 is mechanically connected to the drive motor 47. In particular, the cam switch 62 holds a contact member 63 in the closed position with respect to its associated stationary contacts when the selector switches 20A, 20B and 20C are moving from one position to the next. However, on completion of each step operation of the selector switches 20A, 20B and 20C, the cam switch 62 permits the contact member 63 to become disengaged from its associated stationary contacts. The contact member 63 closes as soon as the tap-changer position selector switches 20A, 20B and 20C rotate "off" position to insure that the motor 47 will remain energized until the tap-changer position selector switch reaches the next position of the selector switches 20A, 20B and 20C. The rotary switch 60 comprises a plurality of contacts 1YR to 8YR and 1DR to 8DR. Each of the contacts 1YR to 8YR and 1DR to 8DR is associated with one of the positions of the tap-changer position selector switches 20A, 20B, 20C and with a position of the delta-Y switches 40 so that one of the contacts closes as each position of said switches is reached. As shown, the rotary switch 60 is actuated by the drive motor 47. A plurality of stationary switches 1YS to 8YS and 1DS to 8DS is connected in series circuit relationship with the contacts 1YR to 8YR and 1DR to 8DR respectively of the rotary switch 60. Each contact of the rotary switch 60 and its corresponding stationary switch is connected between the terminal 99 and the conductor 66 in parallel circuit relationship with the contact member 63 associated with the cam switch 62. A brake 53, which may be of any conventional type, is illustrated as being of the spring-loaded type which is effective whenever the motor 47 is de-energized. The magnetic coil 55 of the brake 53, however, opposes the action of the spring-loaded brake 53 whenever the motor 47 is energized since the coil 55 is connected in parallel circuit relationship with the shunt field 49 of the motor 47. Although the drive motor 47 is illustrated as being of the direct current reversible type, it is obvious that a reversible, alternating current motor could be substituted for the direct current motor 47 assuming that the control circuit 10 was suitably modified.

The operation of the control circuit 10 will now be considered. The control switch 72 or any conventional protective breaker, which may be substituted for the control switch 72, is normally kept in a closed position during the operation of the control circuit 10. The normally closed contacts 74A and 74B will be closed unless a circuit breaker (not shown) with which these contacts are associated, is in a closed position. Either of the contacts 74A or 74B prevents energization of the motor 47 when a circuit breaker (not shown) in the primary circuit of the transformer 30 is in a closed position. This is because the control circuit 10, as illustrated, provides only for no load operation of the tap-changing equipment.

Assuming that the voltage on the secondary windings 42, 44 and 46 of the transformer 30 is to be lowered, the control switch 76 is closed and the contacts 75A and 75B complete the circuit of the operating coil 85 of the "lower" relay 80 assuming that the normally closed circuit 86F of the "raise" relay 82 is not open. The normally closed contacts 86F and 84F are provided to prevent applying control power to either the "raise" or "lower" relays 82 or 80 when the other of said relays is already energized. Once the "lower" relay 80 is energized, the holding contact 84A closes and shunts the contact 75A of the control switch 76. The other side of the operating coil 85 of the lower relay 80 will be connected to the direct current conductor 66 by the contact member 63 associated with the cam switch 62 which will close and shunt the contacts 74B and 75B and the switch 72 as soon as the tap-changer position selector switches 20A, 20B and 20C move "off" position. In addition, the four normally open contacts 84B, 84C, 84D and 84E will connect the conductors 64 and 66 across the shunt field 49 of the motor 47 and across the series field 51 and the armature 45 which will be connected in series circuit relationship, the series circuit being connected across the conductors 64 and 66. The motor 47 will remain energized until the next position of the tap-changer position selector switches 20A, 20B and 20C is reached. The contact member 63 associated with the cam switch 62 will then open and deenergize the operating coil 85 of the "lower" relay 80 and the motor 47 will be deenergized. In similar fashion, when the voltage across the secondary windings 42, 44 and 46 is to be raised, the control switch 78 is closed and the normally open contacts 77A and 77B will close and apply power to the operating coil 87 of the "raise" relay 82. The holding contact 86A of the "raise" relay 82 will then close and in conjunction with the contact member 63, associated with the cam switch 62, form a hold circuit for the operating coil 87 as soon as the tap-changer position selector switches 20A, 20B and 20C move "off" position. The normally open contacts 86B, 86C, 86D and 86E will also close and connect the direct current conductors 64 and 66 across the shunt field 49 and across the series field 51 and the armature 45 in series circuit relationship so that the motor 47 will turn in a direction opposite to that which results when the "lower" relay 80 is energized. The motor 47 will again remain energized until the tap-changer position selector switches 20A, 20B and 20C reach the next position and then the contact member 63 associated with the cam switch 62 will open and deenergize the "raise" relay 82. The motor 47 will then be deenergized in turn.

The effect of the rotary switch 60 on the operation of the control circuit 10 will now be considered. As previously described, the operation of the control circuit 10 is such that once the control switch 76 or the control switch 78 is closed, the drive motor 47 will remain energized until the tap changer position selector switches 20A, 20B and 20C have moved to their next position because of the operation of the cam switch 62. The cam switch 62 thus operates to insure that the drive motor 47 will rotate the tap-changer position selector switches 20A, 20B and 20C one position at a time. The operation of the cam switch 62 with respect to any undesired position of the selector switches 20A, 20B and 20C may be eliminated by closing one of the stationary switches 1YS to 8YS and 1DS to 8DS in the control circuit 10. Then, when the selector switches 20A, 20B and 20C reach the undesired position, one of the contacts 1YR to 8YR and 1DR to 8DR of the rotary switch 60 associated with that particular position will close and short-circuit the contact member 63 associated with the cam switch 62 for that particular position of the selector switches 20A, 20B and 20C. The motor 47 will therefore not stop at the selected, undesired positions of the selector switches 20A, 20B and 20C, but will remain energized until a position of the selector switches is reached which does not have an associated stationary switch closed in the control circuit 10. Each position of the selector switches 20A, 20B and 20C may be associated with either a delta or Y arrangement as controlled by the delta-Y switches 40. The rotary switch 60 is provided with a contact associated with each of the positions of the selector switches 20A, 20B and 20C either for a delta or Y arrangement as determined by the position of the delta-Y switches 40. In summary, any changes in the tap connections made available to the tap-changing equipment can be accomplished simply by changes in the connections of the control circuit 10. These changes are made by closing the appropriate stationary switches associated with undesired tap connections.

Figure 2:
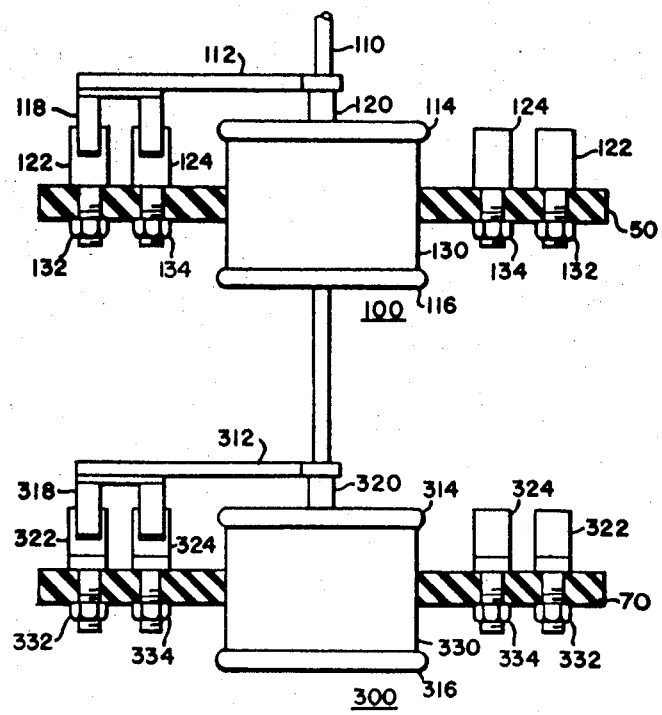
Fig. 2 is a side-elevational view of the delta-Y switches and the tap-changer position selector switches shown in Fig. 1 with some of the parts in section.

Referring to Fig. 2, typical arrangements of the mechanisms for the delta-Y switches 40 and the tap-changer position selector switches 20A, 20B and 20C are illustrated. The tap-changer position selector switch mechanism 300 is shown mounted in the terminal board 70 of the selector switches 20A, 20B and 20C. The delta-Y switch mechanism 100 of the delta-Y switches 40 is shown mounted on the terminal board 50. A first outer circle of stationary contact members 322 are mounted on the terminal board 70 of the selector switches 20A, 20B and 20C. A second inner circle of stationary contact members 324 are also mounted on the terminal board 70. The stationary contact members 324 are electrically connected to form the common terminals 56A, 56B and 56C of the selector switches 20A, 20B and 20C, respectively. The outer circle of stationary contact members 322 comprises the available positions of the selector switches 20A, 20B and 20C. The tap connections on the primary windings 32, 34 and 36 of the transformer 30 are each connected to one of the stationary contact members 322 included as part of the selector switches 20A, 20B and 20C, respectively. The stationary contact members 324 and 322 are shown in the form of studs of conducting material extending through the terminal board 70 of insulating material. The stationary contact members 322 and 324 are secured to the terminal boards by the nuts 332 and 334, respectively. In similar fashion, an outer circle of stationary contact members 122 and an inner circle of stationary contact members 124 are mounted on the terminal board 50 of the delta-Y switches 40 and secured by the nuts 132 and 134, respectively. The stationary contact members 124 are electrically connected to form the common terminals 58 of the delta-Y switches 40. Either the inner circle of stationary contact members 124 or the inner circle of stationary contact members 324 may be replaced by one sliding contact member. The outer circle of stationary contact members 122 comprise the available positions of the delta-Y switches 40. The selector switch mechanism 300 includes a movable contact arm 312 having a bridging contact member 318 which is attached to a switch actuating shaft 320 which is coaxial with an operating shaft 110. The shaft 110 is mechanically linked to the drive motor 47 shown in Fig. 1. In similar fashion, the delta-Y switch mechanism 100 includes a movable contact arm 112 having a bridging member 118 attached thereto, the movable contact arm 112 being attached to the switch actuating shaft 120 which is also mounted coaxially outside the operating shaft 110. In general, the mechanisms 100 and 300 differ in that the contact arm 112 rotates only 45° for each complete revolution of the contact arm 312. The mechanism 100 includes top and bottom end plates 114 and 116, respectively. The mechanism 300 includes top and bottom end plates 314 and 316, respectively.

Figure 3:
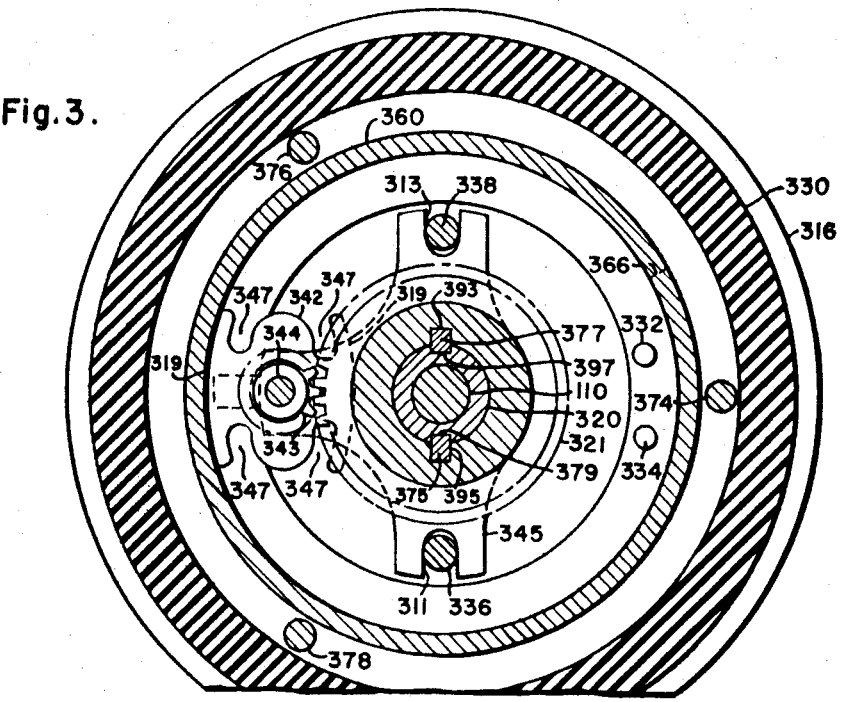
Fig. 3 is a top plan view of the tap-changer position selector switch mechanism, parts being shown in section taken along the line III—III in Fig. 4.
Figure 4:
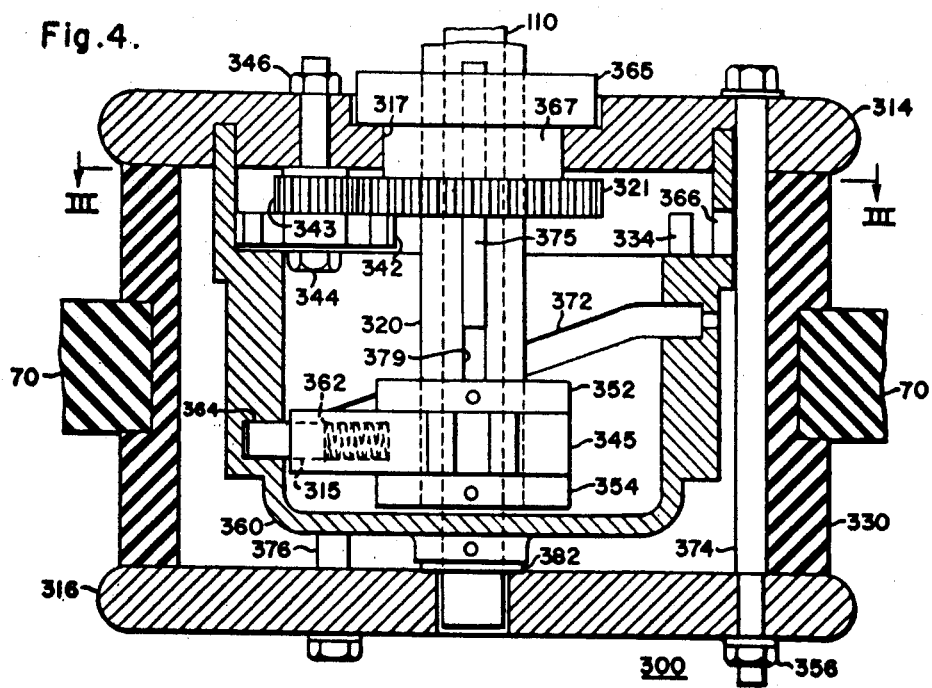
Fig. 4 is a side-elevational view of the tap-changer position selector switch mechanism with the switch in a circuit closing position with certain parts being shown in section.

Referring to Figs. 3 and 4, the mechanism 300 of the tap-changer position selector switches 20A, 20B and 20C includes the end plates 314 and 316 which are separated by the spacer tube 330 and held together by the bolts 374, 376 and 378. As shown in Fig. 4, the mechanism 300 is mounted on the terminal board 70. In general, the mechanism 300 for the tap-changer position selector switches 20A, 20B and 20C is arranged so that the contact arm 312 will raise the contact bridging member off the stationary contacts 322 and 324, rotate the contact arm 312 forty-five degrees, and then lower the contact bridging member 318 back down to the next position of the stationary contact members 322 and 324 during one complete revolution of the operating shaft 110. The cam drum 360 is attached by suitable means to the operating shaft 110. A metal washer 382 is provided between the cam drum 360 and the bottom end plate 316 to provide a bearing surface for the rotation of the cam drum 360. The switch actuating shaft 320 is coaxially mounted outside the operating shaft 110. The cam drum 360 is provided with a cam race 372 on the inside of the cam drum 360. The cam race 372 included a vertically rising portion, a horizontal portion at the top of the cam race, and a portion which slopes down from the horizontal portion.

In order to obtain the necessary reciprocal, axial motion of the switch actuating shaft 320 to raise and lower the contact arm 312, the switch actuating shaft 320 is provided with two collars 352 and 354 which are pinned to the switch actuating shaft and a lift cam 345 which is disposed between the collars 352 and 354. The lift cam 345 can not move axially with respect to the switch actuating shaft 320 because of the collars 352 and 354. As shown in Fig. 3, the lift cam can not rotate because of the guide rods 336 and 338 which are attached to the top end plate 314. The lift cam 345 is provided with two curved recesses 311 and 313 in which are disposed the guide rods 336 and 338, respectively. The lift cam 345 is also provided with a cylindrical opening 315 in which is mounted part of the pin 364 which is held in place by the spring 362. The pin 364 engages the cam race 372 and any rotation of the cam drum 360 will cause the pin 364 and the switch actuating shaft to move up or down except when the horizontal portion of the cam race passes the pin 364.

In order to provide for rotary movement of the switch actuating shaft 320, the cam drum 360 is provided with two pins 332 and 334 which are attached to the cam drum 360. The pins 332 and 334 are disposed to engage an internal starwheel or Geneva gear 342. The Geneva gear 342 is provided with curved recesses 347 which engage the pins 332 and 334 when the pins 332 and 334 are rotated past the Geneva gear 342. The Geneva gear 342 is mounted on a bolt 344 which is secured to the top end plate 314 by the nut 346. The Geneva gear is provided with two curved surfaces 319, one of which always bears against the inner surface of the cam drum 360 to prevent rotation of the Geneva gear except when the Geneva gear 342 is engaged by the pins 334 and 332. A recess 366 in the cam drum 360 allows rotation of the Geneva gear 342 when the Geneva gear 342 is engaged by the pins 332 and 334. The Geneva gear 342 is attached to an idler gear 343 which is also mounted on the bolt 344. The idler gear 343 engages a center gear 321, having the grooves 393 and 395 adjacent to its center which engage the keys 375 and 377 which are secured to the switch actuating shaft 320 in the grooves 379 and 397. The latter arrangement is provided so that the switch actuating shaft 320 will rotate with the center gear 321 and yet be free to move axially. The center gear 321 includes an extension 367 having a smaller diameter which fits the bore 317 of the top end plate 314. The extension 367 of the center gear 321 includes a threaded portion which engages the center gear nut 365 which provides a bearing surface for the center gear. As previously described, the contact arm 312 of the tap-changer position selector switches 20A, 20B and 20C is attached to the switch actuating shaft 320 and follows the axial and rotary motion of the switch actuating shaft.

The operation of the tap-position selector switch mechanism 300 depends on the rotation of the operating shaft 110. In general, during one revolution of the operating shaft 110, the contact arm 312 is first raised to lift the bridging member 318 off the stationary contact members 322 and 324, then rotated 45° and finally lowered back to the next position of the stationary contact members 322 and 324 of the selector switches 20A, 20B and 20C. Referring to Fig. 3 and Fig. 4, during the first portion of one revolution of the operating shaft 110, the cam drum 360 causes the pin 364 and the switch actuating shaft 320 to be lifted vertically. This is because the pin 364 engages the cam race 372 in its vertically rising portion. During the second portion of one revolution of the operating shaft 110, the horizontal portion of the cam race 372 engages the pin 364 and there is no axial movement of the switch actuating shaft 320 or the contact arm 312 which is attached to the switching actuating shaft 320. During this portion of the revolution of the operating shaft 110, the pins 334 and 332 engage the Geneva gear 342 and cause the Geneva gear 342 to rotate 180° while the pins 332 and 334 are engaged with the Geneva gear 342, leaving the Geneva gear with one of the curved surfaces 319 again bearing against the inside surface of the cam drum 360 to prevent further rotation of the Geneva gear 342. The idler gear 343, which is attached to the Geneva gear 342, also rotates 180° and is designed to engage and rotate the center gear 321 forty-five degrees each time that the idler gear rotates 180°. The switch actuating shaft 320 being disposed to follow the rotation of the center gear 321 also rotates 45° when the idler gear rotates 180°. In turn, the contact arm 312, which is secured to the switch actuating shaft 320, also rotates 45° to the next position of the tap-changer position selector switches 20A, 20B and 20C. During the final portion of one revolution of the operating shaft 110, the pin 364 engages the cam race 372 which slopes down from the horizontal portion of the cam race 372 and lowers the switch actuating shaft 320 and the contact arm 312 to their original lower positions.

Figure 5:
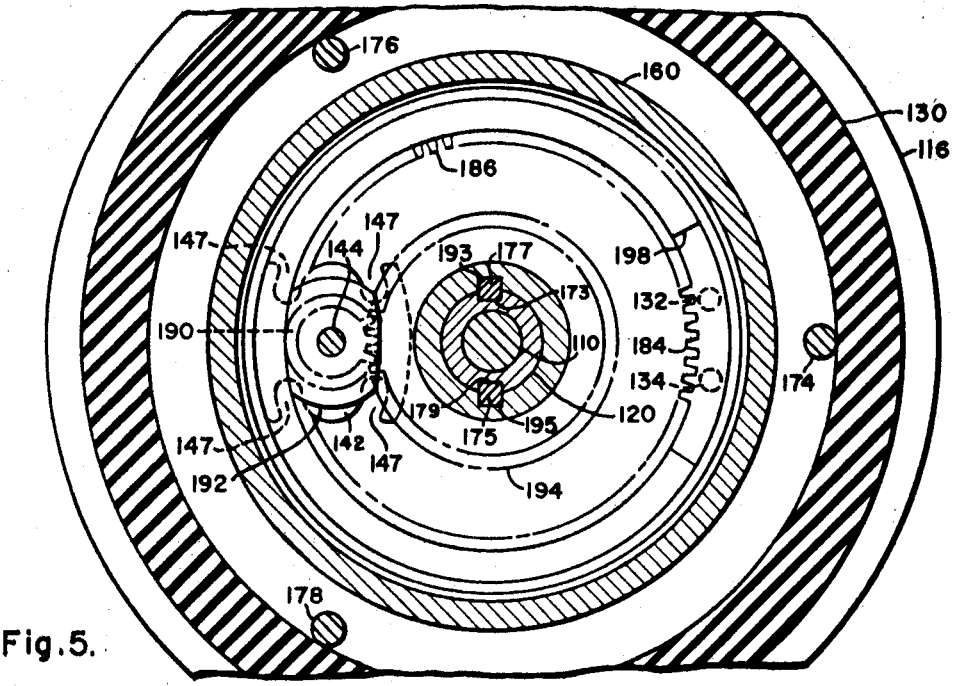
Fig. 5 is a top plan view of the delta-Y switch mechanism, parts being shown in section taken along the line V—V in Fig. 6.
Figure 6:
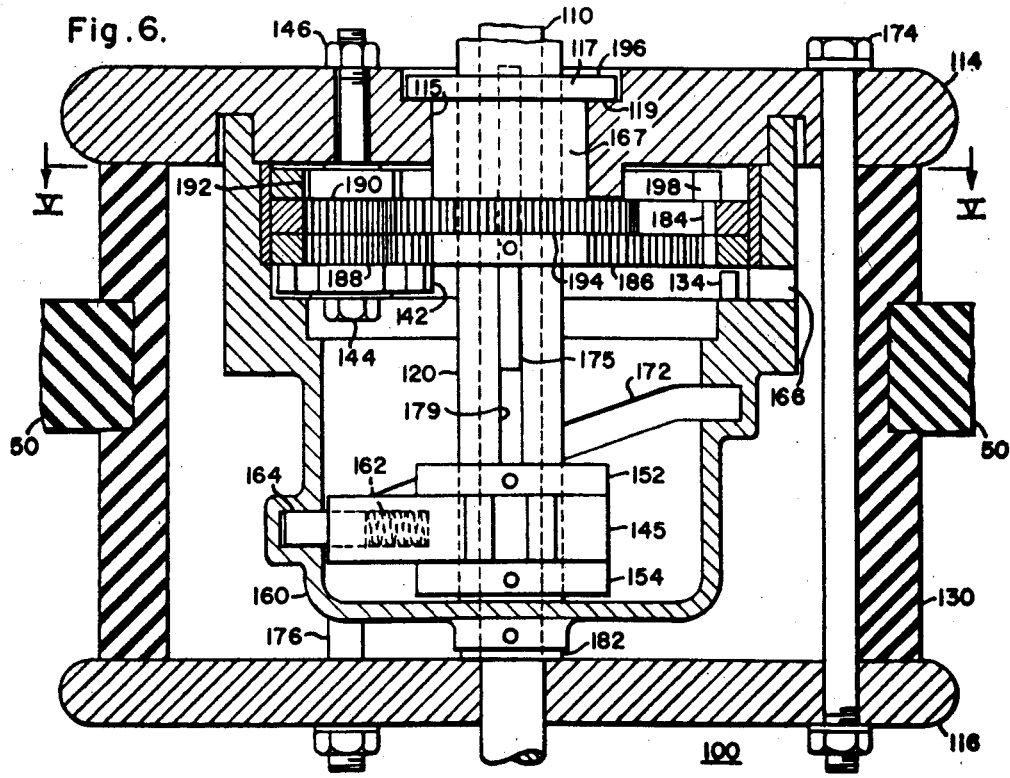
Fig. 6 is a side-elevational view of the delta-Y switch mechanism in a circuit closing position with certain parts being shown in section.

Referring to Figs. 5 and 6, there is illustrated the delta-Y switch mechanism 100 which is mounted on the terminal board 50 of the delta-Y switches 40. The delta-Y switch mechanism includes the top and bottom end plates 114 and 116 respectively, separated by a spacer tube 130 and held together by the bolts 174, 176 and 178. Like the selector switch mechanism 300, the delta-Y switch mechanism 100 includes a cam drum 160 having a cam race 172 which is similar in structure to the cam race 372. The delta-Y switch mechanism 100 is also provided with a switch actuating shaft 120 which is coaxially mounted outside the operating shaft 110. The reciprocal, axial motion of the switch actuating shaft 120 is accomplished by exactly the same means as in the selector switch mechanism 300. The collars 152 and 154 are equivalent to the collars 352 and 354 of the selector switch mechanism 300; the lifting cam 145, and the pin 164 are equivalent to the lifting cam 345 and the pin 364. The spring 162 is provided in similar fashion to hold the pin 164 in place as it engages the cam race 172. The pins 132 and 134 which are attached to the cam drum 160, engage a Geneva gear 142 and operate in similar fashion to the pins 332 and 334, and the Geneva gear 342 of the selector switch mechanism 300. An idler gear 188 is attached to and rotates with the Geneva gear 142. Both the Geneva gear 142 and the idler gear 188 are supported by the bolt 144 which is secured to the top end plate 114 by the nut 146. The idler gear 188 engages an internal gear 186. A rack or portion of an internal gear 184, which is best shown in Fig. 5, is attached to and rotates with the internal gear 186. The rack 184 engages a second idler gear 190 once during each revolution of the internal gear 186. The idler gear 190 in turn engages the center gear 194. The center gear 194 is provided with groves 193 and 195 adjacent to its center which engage the keys 175 and 177, respectively, which are disposed in the grooves 173 and 179, respectively, of the switch actuating shaft 120. The latter arrangement insures that the switch actuating shaft 120 will rotate with the center gear 194 and yet allows axial movement of the switch actuating shaft 120. The center gear 194 includes an extension 167 whose diameter matches the bore 115 of the top end plate 114. The extension 167 and the top portion 117 of the center gear 194 also include extensions of the grooves 193 and 195 of the center gear 194. In order to allow rotation of the Geneva gear 142 when the pins 132 and 134 engage the Geneva gear 142, the cam drum 160 is provided with a recess 166 adjacent to the pins 132 and 134. In order to prevent rotation of the second idler gear 190, a locking cam 192 bears against the inner surface of the cam drum 160 except when the rack 184 engages the second idler gear 190. A recess 198 is provided in the cam drum 160 adjacent to the rack 184 to allow rotation of the locking cam 192 and the second idler gear 190 when the rack 184 engages the second idler gear 190.

In general, the operation of the delta-Y switch mechanism 100 is similar to the operation of the tap-changer position selector switch mechanism 300, except that the additional gear means provided in the delta-Y switch mechanism 100 allows only 45° rotation of the switch actuating shaft 120 at the end of each complete revolution of the switch actuating shaft 320. The reciprocal, axial motion of the switch actuating shaft 120 is accomplished in exactly the same manner as in the selector switch mechanism 300. The pin 164 engages the cam race 172 and when the cam drum 160 rotates, the switch actuating shaft 120 is raised and lowered as the cam drum 160 rotates one revolution. During each revolution of the cam drum 160 and the operating shaft 110, the pins 132 and 134 engage the Geneva gear 142 and rotate the Geneva gear 142 180°. The first idler gear 188 also rotates 180° and causes the internal gear 186 to rotate only 45°. The rack 184 which is attached to the internal gear 186 also rotates only 45° for each revolution of the cam drum 160. Therefore, eight revolutions of the cam drum 160 and the operating shaft 110 are required to rotate the rack 184 a total of 360° or one complete revolution. During each complete revolution, the rack 184 engages the second idler gear 190 and causes the second idler gear 190 to rotate 180°. The second idler gear 190, which engages the center gear 194, then causes the center gear 194 to rotate 45°. The switch actuating shaft 120 rotates with the center gear 194 and also rotates 45° during each complete revolution of the rack 184. In summary, the switch actuating shaft 120 is raised and lowered simultaneously with the switch actuating shaft 320. The switch actuating shaft 120, however, rotates only 45° for each complete revolution of the switch actuating shaft 320. This means that the contact arm 112, which is attached to the switch actuating shaft 120, moves only one position for each complete revolution of the contact arm 312. Therefore, the primary windings of the transformer 30 are alternately connected in Y or delta for each revolution of the tap-changer position selector switches 20A, 20B and 20C.

It is to be understood that cam switches may be substituted for the rotary switch 60 shown as part of the control circuit 10 in Fig. 1. Removable conductor links might also be substituted for the stationary switches 1YS to 8YS and 1DS to 8DS shown as part of the control circuit 10 in Fig. 1. It is also to be understood that the switch mechanisms 100 and 300, shown in Figs. 3, 4, 5 and 6, are illustrative and other types of conventional well-known switch mechanisms may be provided to perform the same operation. For example, a rack and pinion gear might be substituted for the pin and Geneva gear arrangement as part of the switch mechanisms 100 and 300.

Although the control circuit 10 is illustrated for no load operation, the control circuit 10 could be modified by conventional means to operate with preventive autotransformers for operation of the disclosed tap-changing equipment under load.

The apparatus embodying the teachings of this invention has several advantages. For instance, an intermediate terminal board located inside the transformer tank and having movable links to select a limited number of tap connections or to make available a limited number of tap connections to the tap-changing equipment is eliminated. In the tap-changing system disclosed, undesirable tap connections may be eliminated by relatively simple changes in the connections of the tap-changing control circuit. Therefore, the tap connections available to the tap-changing equipment can be changed without opening the transformer tank and allowing the insulating liquid in the transformer to cool sufficiently to allow a man to enter the tank. The invention also discloses a manner whereby all tap connections in the windings of the transformer for both delta and Y connections of the trasformer windings are available to the tap-changing equipment.

Since numerous changes may be made in the above-described apparatus and circuit, and different embodiments of the invention may be made without departing from the spirit and scope thereof, it is intended that all the matter contained in the foregoing description and shown in the accompanying drawings, shall be interpreted as illustrative and not in a limiting sense.

We claim as our invention:

1. A tap changer for transformers including, a multiple position switch, an operating shaft for causing movement of said switch, a drive motor for rotating said shaft, a control circuit for energizing said motor to change positions of said multiple position switch, cam switch means actuated by said shaft, said cam switch means having contacts connected to said control circuit to close after said control circuit energizes said motor and maintain energization of said motor until said multiple position switch reaches its next position and then to open and deenergize said motor, and means actuated by said shaft for shorting out said cam switch contacts when selected, undesired positions of said multiple position switch are reached to maintain energization of said motor and to prevent said multiple position switch from stopping at said undesired positions.

2. A tap changer for transformers including, a multiple position switch, an operating mechanism for causing movement of said switch having a main drive shaft, a drive motor for rotating said shaft, a control circuit for energizing said motor to change positions to said multiple position switch, cam switch means actuated by said shaft, said cam switch means having contacts connected to said control circuit to close after said control circuit energizes said motor and maintain energization of said motor until said multiple position switch reaches its next position and then to open and deenergize said motor, and means actuated by said shaft for shorting out said cam switch contacts when selected, undesired positions of said multiple position switch are reached to maintain energization of said motor and to prevent said multiple position switch from stopping at said undesired positions, said means comprising an additional cam switch means having contacts connected in circuit relation with said control circuit.

3. A tap changer for transformers including, a multiple position switch, an operating mechanism for causing movement of said switch having a main drive shaft, a drive motor for rotating said shaft, a control circuit for energizing said motor to change positions of said multiple position switch, cam switch means actuated by said shaft, said cam switch means having contacts connected to said control circuit to close after said control circuit energizes said motor and to maintain energization of said motor until said multiple position switch reaches its next position and then to open and deenergize said motor, and means actuated by said shaft for shorting out said cam switch contacts when selected, undesired positions of said multiple position switch are reached to maintain energization of said motor and to prevent said multiple position switch from stopping at said undesired positions, said means comprising a rotary switch actuated by said main drive shaft and connected to said control circuit.

4. In combination, a multiple position switch, an operating shaft for causing movement of said switch, a drive motor for rotating said shaft, a control circuit for energizing said motor to change positions of said switch, first means actuated by said shaft and connected to said control circuit for closing after said control circuit energizes said motor and then for opening and deenergizing said motor upon the reaching of the next position of said switch, and second means actuated by said shaft for preventing said first means from deenergizing said motor when selected, undesired positions of said switch are reached after said motor is energized.

5. In combination, a multiple position switch, an operating shaft for causing movement of said switch, a drive motor for rotating said shaft, a control circuit for energizing said motor to change positions of said switch, cam switch means actuated by said shaft and connected to said control circuit for closing when said motor is energized and said multiple position switch moves off position and then for opening and deenergizing said motor upon the reaching of the next position of said switch, and second means actuated by said shaft for preventing said first means from deenergizing said motor when selected, undesired positions of said switch are reached after said motor is energized.

6. In combination, a multiple position switch, an operating shaft for causing movement of said switch, a drive motor for rotating said shaft, a control circuit for energizing said motor to change positions of said switch, first means actuated by said shaft and connected to said control circuit for closing when said control circuit energizes said motor to move said multiple position switch off position and then for opening and deenergizing said motor upon the reaching of the next position of said switch, and second means including rotary switch means actuated by said shaft and stationary switch means associated with each position of said multiple position switch for shorting out said first means and preventing said first means from deenergizing said motor when selected, undesired positions of said switch are reached after said motor is energized.

7. A tap changer system for a transformer having a plurality of phase windings each with a plurality of tap connections, a first multiple position switch for selecting one of said tap connections in each of said phase windings, a second multiple position switch for alternately selecting either a delta or star connection of said phase windings when said first switch is changed from one predetermined position to another, an operating shaft for changing positions of said switches, a drive motor for driving said shaft, a control circuit for energizing said motor, first means actuated by said shaft and connected to said control circuit for maintaining the energization of said motor after said motor is energized until the next position of said first switch is reached and then for deenergizing said motor, and second means actuated by said shaft having contacts associated with each position of said switches, said contacts of said second means being connected in said control circuit for preventing said first means from deenergizing said motor when undesired positions of said switches are reached after said motor is energized.

8. A tap changer system for a transformer having a plurality of phase windings each with a plurality of tap connections, a first multiple position switch for selecting one of said tap connections in each of said phase windings, a second multiple position switch for alternately selecting either a delta or star connection of said phase windings when said first switch is changed from one predetermined position to another, an operating shaft for changing positions of said switches, a drive motor for driving said shaft, a control circuit for energizing said motor, first means actuated by said shaft and connected to said control circuit for maintaining the energization of said motor after said motor is energized until the next position of said first switch is reached and then for deenergizing said motor, said first means comprising cam switch means, and second means actuated by said shaft having contacts associated with each position of said switches, said contacts of said second means being connected in said control circuit for preventing said first means from deenergizing said motor when undesired positions of said switches are reached after said motor is energized.

9. A tap changer system for a transformer having a plurality of phase windings each with a plurality of tap connections, a first multiple position switch for selecting one of said tap connections in each of said phase windings, a second multiple position switch for alternately selecting either a delta or star connection of said phase windings when said first switch is changed from one predetermined position to another, an operating shaft for changing positions of said switches, a drive motor for driving said shaft, a control circuit for energizing said motor, first means actuated by said shaft and connected to said control circuit for maintaining the energization of said motor after said motor is energized until the next position of said first switch is reached and then for deenergizing said motor, said first means comprising first cam switch means, and second means actuated by said shaft having contacts associated with each position of said switches, said contacts of said second means being connected in said control circuit for preventing said first means from deenergizing said motor when undesired positions of said switches are reached after said motor is energized, said second means comprising second cam switch means.

10. A tap changer system for a transformer having a plurality of phase windings each with a plurality of tap connections, a first multiple position switch for selecting one of said tap connections in each of said phase windings, a second multiple position switch for alternately selecting either a delta or star connection of said phase windings when said first switch is changed from one predetermined position to another, an operating shaft for changing positions of said switches, a drive motor for driving said shaft, a control circuit for energizing said motor, first means actuated by said shaft and connected to said control circuit for maintaining the energization of said motor after said motor is energized until the next position of said first switch is reached and then for deenergizing said motor, said first means comprising cam switch means, and second means actuated by said shaft having contacts associated with each position of said switches, said contacts of said second means being connected in said control circuit for preventing said first means from deenergizing said motor when undesired positions of said switches are reached after said motor is energized, said second means comprising rotary switch means.

11. A tap changer for transformers including, a multiple position switch, an operating shaft for causing movement of said switch, a drive motor for rotating said shaft, a control circuit for energizing said motor to change positions of said multiple position switch, cam switch means actuated by said shaft, said cam switch means having contacts connected to said control circuit to close after said control circuit energizes said motor and maintain energization of said motor until said multiple position switch reaches its next position and then to open and deenergize said motor, means actuated by said shaft for shorting out said cam switch contacts when selected, undesired positions of said multiple position switch are reached to maintain energization of said motor and to prevent said multiple position switch from stopping at said undesired positions, and stationary switch means connected in circuit relation between said last-mentioned means and said control circuit for selecting the undesired positions of said multiple position switch.

12. A tap changer for transformers including, a multiple position switch, an operating mechanism for causing movement of said switch having a main drive shaft, a drive motor for rotating said shaft, a control circuit for energizing said motor to change positions of said multiple position switch, cam switch means actuated by said shaft, said cam switch means having contacts connected to said control circuit to close after said control circuit energizes said motor and maintain energization of said motor until said multiple position switch reaches its next position and then to open and deenergize said motor, means actuated by said shaft for shorting out said cam switch contacts when selected, undesired positions of said multiple position switch are reached to maintain energization of said motor and to prevent said multiple position switch from stopping at said undesired positions, said means comprising an additional cam switch means having contacts connected in circuit relation with said control circuit, and stationary switch means connected in circuit relation between said cam switch means and said control circuit for selecting the undesired positions of said multiple position switch.

13. A tap changer for transformers including, a multiple position switch, an operating shaft for causing movement of said switch, a drive motor for rotating said shaft, a control circuit for energizing said motor to change positions of said multiple position switch, cam switch means actuated by said shaft, said cam switch means having contacts connected to said control circuit to close after said control circuit energizes said motor and maintain energization of said motor until said multiple position switch reaches its next position and then to open and deenergize said motor, means actuated by said shaft for shorting out said cam switch contacts when selected, undesired positions of said multiple position switch are reached to maintain energization of said motor and to prevent said multiple position switch from stopping at said undesired positions, and means connected in circuit relation between the last-mentioned means and said control circuit for selecting the undesired positions of said multiple position switch.

14. A tap changer for transformers including, a multiple position switch, an operating mechanism for causing movement of said switch having a main drive shaft, a drive motor for rotating said shaft, a control circuit for energizing said motor to change positions of said multiple position switch, cam switch means actuated by said shaft, said cam switch means having contacts connected to said control circuit to close after said control circuit energizes said motor and to maintain energization of said motor until said multiple position switch reaches its next position and then to open and deenergize said motor, means actuated by said shaft for shorting out said cam switch contacts when selected, undesired positions of said multiple position switch are reached to maintain energization of said motor and to prevent said multiple position switch from stopping at said undesired positions, said means comprising a rotary switch actuated by said main drive shaft and connected to said control circuit, and means connected in circuit relation between said rotary switch means and said control circuit for selecting the undesired positions of said multiple position switch.

15. A tap changer for transformers including, a multiple position switch, an operating shaft for causing movement of said switch, a drive motor for rotating said shaft, a control circuit for energizing said motor to change positions of said multiple position switch, cam switch means actuated by said shaft, said cam switch means having contacts connected to said control circuit to close after said control circuit energizes said motor and maintain energization of said motor until said multiple position switch reaches its next position and then to open and de-energize said motor, means actuated by said shaft for shorting out said cam switch contacts when selected, undesired positions of said multiple position switch are reached to maintain energization of said motor and to prevent said multiple position switch from stopping at said undesired positions, and a plurality of conductors connected in circuit relation between the last-mentioned means and said control circuit for connecting the last-mentioned means to said control circuit to select the undesired positions of said multiple position switch.

16. In combination, a multiple position switch, an operating shaft for causing movement of said switch, a drive motor for rotating said shaft, a control circuit for energizing said motor to change positions of said switch, first means actuated by said shaft and connected to said control circuit for closing after said control circuit energizes said motor and then for opening and de-energizing said motor upon the reaching of the next position of said switch, second means actuated by said shaft for preventing said first means from deenergizing said motor when selected, undesired positions of said switch are reached after said motor is energized, and a plurality of conductors connected in circuit relation between said second means and said control circuit for connecting said second means to said control circuit to select the undesired positions of said multiple position switch.

References Cited in the file of this patent
UNITED STATES PATENTS 2,762,961    Colby ------------------ Sept. 11, 1956